Figure 1:
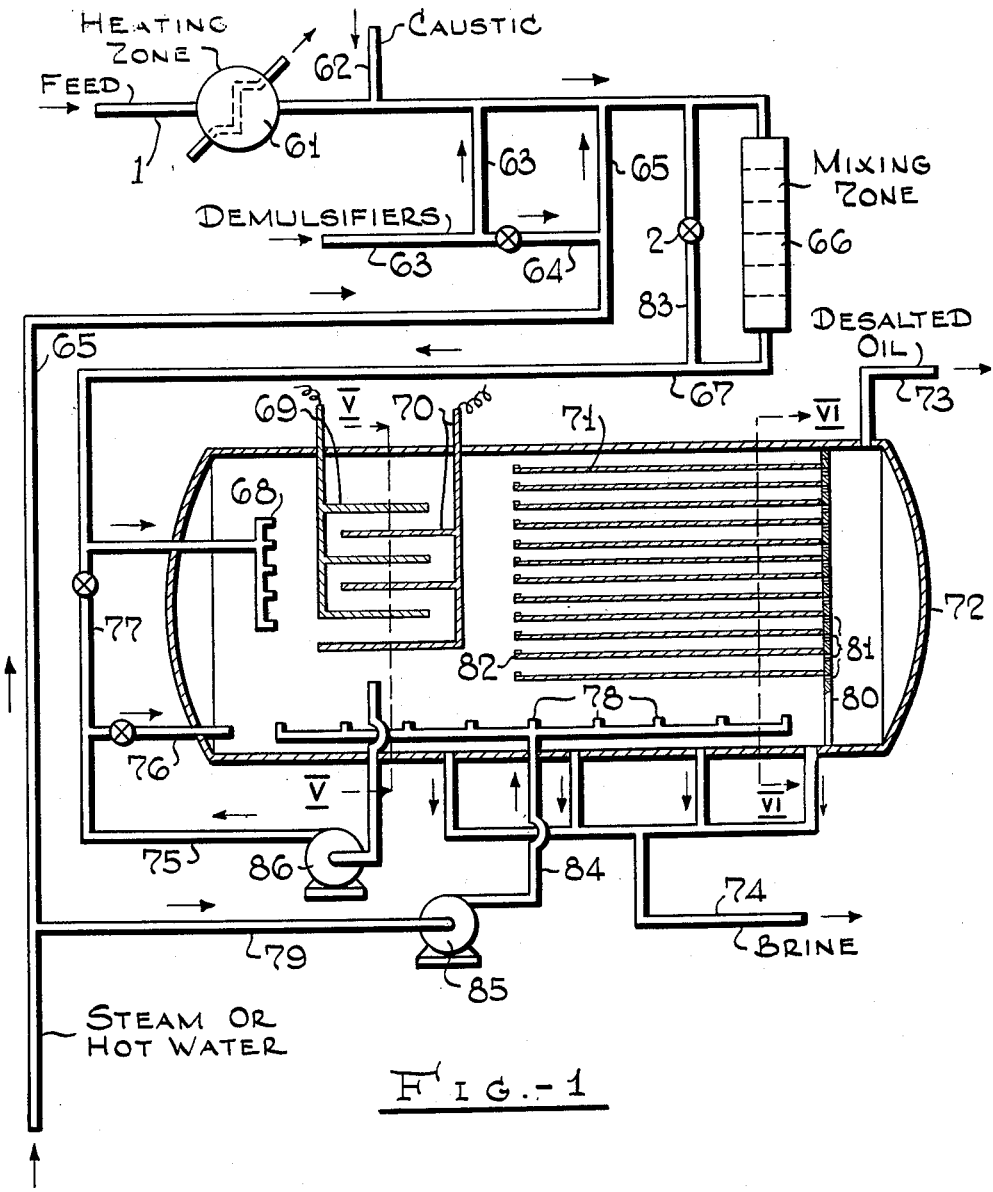

Feb. 11, 1958   J. W. PACKIE ET AL   2,823,181
APPARATUS FOR BREAKING EMULSIONS
Filed Nov. 1, 1951   2 Sheets-Sheet 2

United States Patent Office 2,823,181
Patented Feb. 11, 1958

2,823,181

APPARATUS FOR BREAKING EMULSIONS

John W. Packie, Maplewood, William H. Hesketh, Summit, and Reid F. Stearns, Scotch Plains, N. J., assignors to Esso Research and Engineering Company, a corporation of Delaware Application November 1, 1951, Serial No. 254,256

5 Claims. (Cl. 204—302)

The present invention is concerned with an improved electrical coalescence apparatus. It is more specifically directed toward an improved apparatus for the breaking of oil emulsions, as for example aqueous oil emulsions. A particular adaptation of the present invention relates to an improved apparatus for treating hydrocarbon oils to remove foreign substances therefrom, as for example, for the removal of salt from fluid hydrocarbon streams containing the same. The invention is especially concerned with an improved apparatus for electrical desalting wherein the flow of the fluid stream being desalted is controlled in a critical manner.

It is well known in the art that various petroleum crudes contain salts and other deleterious substances in various concentrations. These salts comprise magnesium chloride, calcium chloride and sodium chloride. Among other metals present are iron, strontium, potassium and vanadium. Their salts may be present as the bromides, the sulfates, the carbonates and the bicarbonates. It is necessary that these salts be removed from crudes or at least reduced to a large extent since the salts not only cause corrosion of the refining equipment, but also plug equipment, as for example, heat exchangers, condensers and the like. While sodium chloride usually is present in the largest concentration, the magnesium chloride and the calcium chloride apparently cause the greatest amount of corrosion and damage of the refining and distillation equipment. It is thus known to remove these objectionable salts by various procedures.

One conventional method employed is to add water to the crude containing these salts and to heat the mixture to an elevated temperature, as for example to about 300° F. The heated stream is maintained at an elevated pressure, as for example of about 200 lbs. In a desalting operation of this character in order to secure excellent contact between the water and the salt in the crude, it is necessary to secure complete mixing of the water and the crude oil which results in the formation of an emulsion of the oil and water. The mixing may be secured by any means but it is usually accomplished by passing the stream through a pressure reducing valve. The resulting emulsion is usually passed through a bed of coagulation material which generally comprises sand. The stream is then passed to a settling zone wherein the water and oil segregate. The water phase containing the salt is withdrawn from the bottom of the settling zone while the oil phase which is usually substantially free of salt is removed from the top of the settling zone. The extent to which the oil is freed of salt is to a large degree a function of the size of the equipment and the amount of water employed. Usually, in order to secure a satisfactory lowering of the salt content of the oil it is necessary to employ relatively large equipment.

Various electrical processes have also been suggested. In general, these processes comprise adding water to the salt containing crude, heating the mixture to a temperature of about 200° F. at a pressure of about 75 lbs. and passing the stream through a pressure reducing valve or other mixing means to secure adequate mixing which results in emulsification. The emulsion is passed into a zone containing electrodes which maintain an electrical field between the same. Due to the effect of the electrical field, breaking of the emulsion results which permits the aqueous phase to segregate from the oil phase. The salt to a large extent associates itself with the water phase. While these processes have been satisfactory, it is necessary to employ relatively large equipment.

In accordance with the present invention, it has now been discovered that providing the electrical desalting operation be conducted in a manner to pass a stream first through an electrical zone in which it is subjected to the effects of an electrical field and then passed through a separate and distinct settling zone, unexpected and desirable results are secured. Preferred embodiments of the present invention are secured by the utilization of a plurality of parallel surfaces, preferably sloped surfaces both in the electrical zone and in the coalescent zone.

Figure 2:
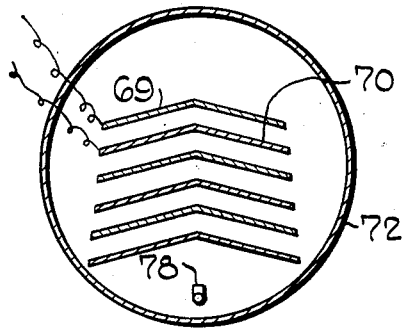
Figure 3:
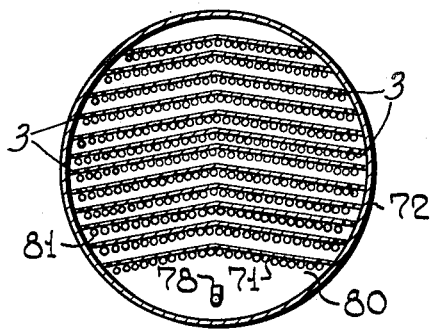

The present invention may be readily understood by reference to the drawings illustrating preferred embodiments of the same. Figure 1 illustrates the improved desalting operation, while Figure 2 illustrates the electrodes and Figure 3 shows in detail the preferred type of coalescent surfaces.

Referring specifically to Figure 1, a feed oil to be desalted is introduced into the system by means of line 1, heated to the desired temperature in heating zone 61 and mixed with caustic which is introduced by means of line 62. A de-emulsifier is added to the oil stream by means of line 63.

However, under certain circumstances, it is preferable to add the de-emulsifier directly to the hot water stream by means of line 64. Hot water is added to the oil stream by means of line 65 and the entire mixture passed through a mixing zone 66. It is to be understood that the mixing zone preferably comprises a valve wherein the pressure is reduced in order to secure turbulence and suitable mixing. When this preferred mode of operation is conducted, the feed mixture is passed through pressure reducing valve 2 and line 83 instead of through mixer 66. The emulsion is withdrawn from zone 66 by means of line 67 and passed through jets 68 in order to jet the emulsion between electrodes 69 and 70. A suitable voltage potential is maintained between the positive and negative plates of the electrodes in order to secure breaking of the emulsion. The treated emulsion is withdrawn from the electrical zone and passed horizontally between coalescent surfaces 71. In accordance with the present invention, these coalescent surfaces comprise chevron type structures. The desalted oil is withdrawn from the upper part of the desalting zone 72 by means of line 73. The desalting zone comprises a cylindrical horizontal vessel. The aqueous layer containing the salt is withdrawn from a plurality of points from the bottom of zone 72 by means of line 74. This brine solution may be further handled in any manner desirable to remove entrained oil particles.

In accordance with the present invention, unbroken emulsion is withdrawn from an intermediate point in zone 72 by means of line 75 and is preferably recycled into the water layer existing on the bottom of zone 72 by means of line 76. A portion of this unbroken emulsion or all of it under certain conditions may be re-introduced into feed line 67 by means of line 77. If satisfactory breaking of the emulsion is not secured, the operation may be controlled by the introduction of steam or hot water into the bottom of zone 72 at a plurality of injection points 78 by means of line 79, pump 85 and line 84.

Coalescent surfaces 71 have lip elements 82 which prevent the backflowing of water into the electrical zone. The separated aqueous phase flows through holes 3 or equivalent openings of the coalescent surfaces. These holes are adjacent the inner wall of the desalting zone thus permitting the flow of water along the inner wall of the desalting zone. A header element 80 prevents the free flow of the respective streams between the coalescent elements 71. The header element has a plurality of openings 81 immediately below each coalescent surface. The number of openings between the respective surfaces is so adjusted as to secure a uniform pressure drop between all elements, thus insuring equal distribution of flow of the streams between the respective coalescent elements.

The chevron type electrodes and coalescent surfaces utilized are illustrated in Figures 2 and 3, showing cross-sectional views of the electrodes 69 and 70, and coalescent surfaces 71. It is apparent that each stream flowing between surfaces 71 will have a cross-sectional shape of an inverted V. Figure 2 illustrates a view taken through section V—V while Figure 3 illustrates a view taken through section VI—VI.

Although the present invention has been described with its specific application to the desalting of a crude oil, it is broadly concerned with an improved electrical coalescence process and apparatus therefor. It may be adapted to the breaking of any emulsion, particularly aqueous emulsions. The invention is directed to a process wherein the feed stream is subjected to the effect of an electrical field and is subsequently passed to a distinct and separate coalescent zone. The particular pressures and temperatures employed in an operation are dependent upon the character of the stream being treated, as well as upon the type and concentration of the dispersed substances present. As pointed out, the present invention is more broadly concerned with an electrical desalting operation wherein the electrical treating zone and the settling zone are separate and distinct areas and wherein chevron type surfaces are employed.

In accordance with the present invention, the oil to be desalted is treated with a neutralizing agent, as, for example, with a caustic or carbonate solution. The oil is then contacted with a chemical de-emulsifying reagent and emulsified with water. It is preferred that the temperature of the water added be in the range of 150° F to 350° F., preferably in the range from 220° F. to 270° F. The chemical reagent may be any known de-emulsification material suitable for aiding emulsion breaking. The emulsion is passed through an electrical zone wherein it is subjected to the effects of an electrical field. The electrical field may be secured by any known procedure and arrangement of anodes and cathodes. The voltage between the electrodes may be varied appreciably and may be in the range from about 5000 to 35,000 volts and higher; a desirable voltage is in the range of from about 16,000 to 20,000 volts. The respective phases flow from the electrical field and are passed to a settling zone. In accordance with one embodiment of the invention, any unbroken emulsion inherently recycles itself to the electrical field section where it is resubjected to the effects of the electrical field.

In essence, the process is conducted in two distinct stages which are specifically designed for distinct purposes. The electrical field stage is designed to efficiently subject the stream to the effects of the electrical field irrespective of settling requirements while the settling stage is designed to secure rapid and efficient settling irrespective of electrical field requirements.

The emulsification results from the extensive mixing of the respective phases which is necessary in order to secure the desired removal of the salt. As pointed out, various de-emulsification agents may be used, as well as agents for the adjustment of the pH value. One agent of the latter class is sodium hydroxide which is usually employed in a concentration which varies from about 0 to 15 lbs. of sodium hydroxide per thousand barrels of oil being desalted. The oil is usually heated to a temperature in the range from about 150° F. to 350° F. and maintained at a pressure in the range from about 25 lbs. to 300 lbs. per square inch. In accordance with the preferred adaptation of the present invention, the oil is heated to a temperature in the range from about 220° F. to 270° F. and maintained at a pressure in the range from about 100 lbs. to 250 lbs. per sq. in. gauge. The mixing is secured by passing the heated stream under pressure through a pressure-reducing valve or equivalent means so as to reduce the pressure thereon. It is desirable to have a pressure drop of from about 25 to 85 lbs. per sq. in. through the mixing valve. Obviously, if the feed stream contains a sufficient quantity of water, it may not be necessary to add additional water. A particularly desirable method of desalting a crude oil is to heat the same to a temperature of about 250° F. and to maintain the pressure on the stream at about 220 lbs. to 240 lbs. per sq. in. gauge. This stream is passed through a pressure reducing valve or equivalent means wherein the pressure is reduced, for example, to about 140 to 150 lbs. per sq. in. gauge.

As pointed out heretofore, by operating in accordance with the present invention the time necessary for the emulsion to break is appreciably lowered, thus requiring smaller equipment for equivalent throughputs. The actual size of the equipment may vary appreciably depending upon various factors, such as feed rates, salt concentration in the feed oil and upon other characteristics, as, for example, viscosity of the feed. In accordance with the present invention, it is very desirable that the settling zone contain a plurality of vertically spaced coalescent elements. These coalescent elements are preferably parallel with respect to one another and may be spaced apart with respect to one another from about 1" to 20" apart. However, it is preferred that the spacing be from about 2" to 6".

In accordance with a preferred adaptation of the present invention, both the electrodes and coalescent elements are of the chevron type or inverted V structure. Thus, each stream flowing between these chevron surfaces will have a cross-sectional shape of an inverted V. With respect to the electrodes and the coalescent surfaces, the pitch should preferably be in the range from about 10 to 20 degrees. It is preferred that the electrode elements extend to within two to six inches of the inner surface of the desalting zone. It is also preferred that the coalescent surfaces extend to the inner side of the desalting zone with holes provided in the coalescent surfaces adjacent the inner wall of the desalting zone, to permit the separated aqueous phase to flow through the holes and along the inner wall of the desalting zone to the bottom of said desalting zone from which the separated aqueous phase can be withdrawn.

The invention may be further illustrated by the following examples illustrating embodiments of the same.

*Example I*

In a conventional operation wherein the feed rate was 50,000 barrels per day, water was added to a crude containing 1 to 3% of water and 250 lbs. salt per 1000 barrels, to increase the water content to about 15% to 20% by volume. The mixture was heated to a temperature of about 200° F. and maintained at a pressure of about 75 lbs. per sq. in. gauge. The pressure was reduced to 50 lbs. on the crude securing mixing resulting in the formation of an emulsion. In a conventional electrical desalting unit, the hold-up time necessary to secure the breaking of the emulsion satisfactorily is about 60 minutes.

In a second operation conducted under identical conditions, except that the separation zone was maintained separate and distinct from the electrical field zone and wherein coalescent surfaces are spaced on 6" centers, the hold-up time is about 10 minutes. Thus, it is apparent that equipment only one-sixth of the size of equipment is required in this second operation as compared to the size of the equipment required in the first operation.

In a third operation conducted, utilizing two distinct stages in accordance with the process of the present invention and wherein the coalescent surfaces are spaced on about 2" centers, the hold-up time necessary to secure the breaking of the emulsion is about 3 minutes. In this third operation, the electrical precipitator is about 5 ft. in diameter and 15 ft. long. The settler is about 5 ft. in diameter and about 20 ft. long. In the second operation wherein the baffles are spaced on 6" centers, the settler is about 7½ ft. in diameter and about 40 ft. long.

*Example II*

A West Central Texas crude having a gravity of 40° API and containing 33 lbs. of salt per 1000 barrels was processed as follows: A sodium hydroxide solution (4° to 5° Bé.) was mixed with the crude together with a chemical de-emulsifying agent. The crude was heated to a temperature of about 250° F. and emulsified. The emulsion was passed through chevron type electrodes having a voltage potential of about 16,000 volts. The broken emulsion was passed along longitudinally disposed chevron type coalescent surfaces disposed in said desalting zone adjacent the electrolytic zone. The desalted crude had a final salt content of about 5 lbs. per 1000 barrels. The rate of this operation was about 800 barrels per day. When the same crude was desalted in a similar manner utilizing conventional commercial desalting apparatus of the same size, the rate was about 200 barrels per day.

*Example III*

A San Joaquin crude having a gravity of 44° API and a salt content of 32 lbs. per 1000 barrels was treated in a manner as described with respect to Example II. The temperature utilized was 210° F. The pressure was about 65 lbs. per sq. inch. The desalted crude had a salt content of 2 lbs. per 1000 barrels. The rate was 500 barrels per day. When desalting the same crude in a conventional commercial desalter of the same size under similar conditions, the rate was 200 barrels per day.

*Example IV*

A South Louisiana crude having a gravity of 37° API and a salt content of 26 lbs. per 1000 barrels was desalted to 1 lb. per 1000 barrels at a rate of 400 barrels per day when utilizing the process of the present invention.

When desalting the same crude to the same extent in a conventional commercial apparatus of the same size, the rate was 200 barrels per day.

What is claimed is:

1. Apparatus for breaking emulsions which comprises an emulsion breaking cylindrical horizontal vessel, an emulsion feed conduit disposed at one end of said vessel, a plurality of electrodes disposed in said vessel and adjacent said feed conduit, a plurality of superimposed elongated inverted V-shaped elements each having an upper coalescent surface disposed in said vessel intermediate said electrodes and the other end of said vessel, said inverted V-shaped elements being attached at one end thereof to a vertically disposed plate header element, said header plate element being characterized by containing apertures between said inverted V-elements, separate conduits for withdrawing oil from the top of said vessel and water from the bottom of said vessel.

2. Apparatus as defined by claim 1 wherein conduit means are provided for withdrawing emulsion from said cylindrical vessel at a level above said conduit for the withdrawal of water from said vessel and below said electrodes, and wherein conduit means are provided for re-introducing said withdrawn emulsion into the vessel at a point at a level approximately the point of said means for the withdrawal of the water.

3. Apparatus as defined by claim 1 wherein said electrodes comprise a plurality of superimposed elongated V-shaped elements.

4. Apparatus as defined by claim 1 wherein conduit means are provided at the bottom of said vessel at a plurality of points for the withdrawal of water.

5. Apparatus as defined by claim 1 wherein said emulsion feed means comprise jets so disposed as to jet the emulsion between said electrodes.

References Cited in the file of this patent

UNITED STATES PATENTS

| | | |
|---|---|---|
| 1,579,515 | Cason | Apr. 6, 1926 |
| 1,635,845 | Holford | July 12, 1927 |
| 1,838,932 | Fisher | Dec. 29, 1931 |
| 1,873,857 | Worthington et al. | Aug. 23, 1932 |
| 1,980,722 | Garrison et al. | Nov. 13, 1934 |
| 2,077,057 | Poole | Apr. 13, 1937 |
| 2,375,590 | Schonberg et al. | May 8, 1945 |
| 2,666,739 | Packie | Jan. 19, 1954 |